(No Model.)

W. DULIN.
WIRE REEL.

No. 486,928. Patented Nov. 29, 1892.

Witnesses
John M. Walsh
K. J. Hussen

Inventor
William Dulin
By his Attorneys
Alexander & Davis

UNITED STATES PATENT OFFICE.

WILLIAM DULIN, OF AVOCA, IOWA, ASSIGNOR OF ONE-HALF TO H. R. DULIN, OF SAME PLACE.

WIRE-REEL.

SPECIFICATION forming part of Letters Patent No. 486,928, dated November 29, 1892.

Application filed March 5, 1892. Serial No. 423,873. (No model.)

*To all whom it may concern:*

Be it known that I, WILLIAM DULIN, a citizen of the United States, residing at Avoca, in the county of Pottawattamie and State of Iowa, have invented certain new and useful Improvements in Wire-Reels, of which the following is a specification, reference being had therein to the accompanying drawings.

This invention relates to improvements upon the machine patented to me on the 26th day of January, 1892, and numbered 467,499; and it has for its object to provide a machine of simple construction, which will be efficient in operation and which may be mounted on the wheels of any ordinary farming implement—such, for instance, as a corn-plow.

The invention consists in the novel combination and arrangement of parts more fully hereinafter described and claimed.

Figure 1:
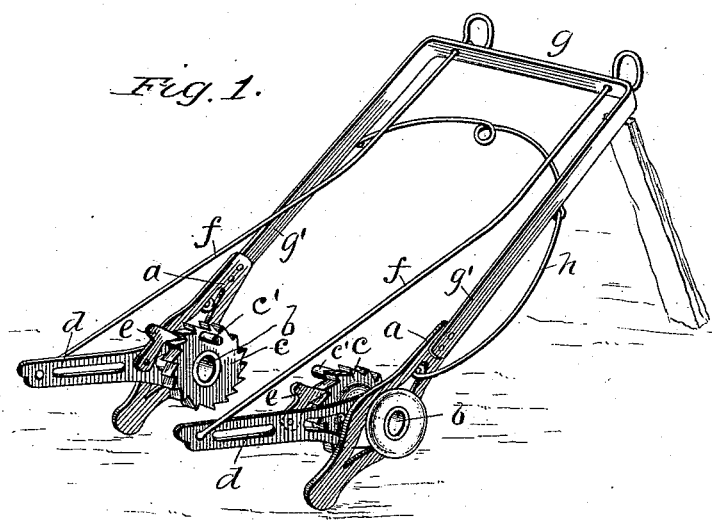
Figure 2:
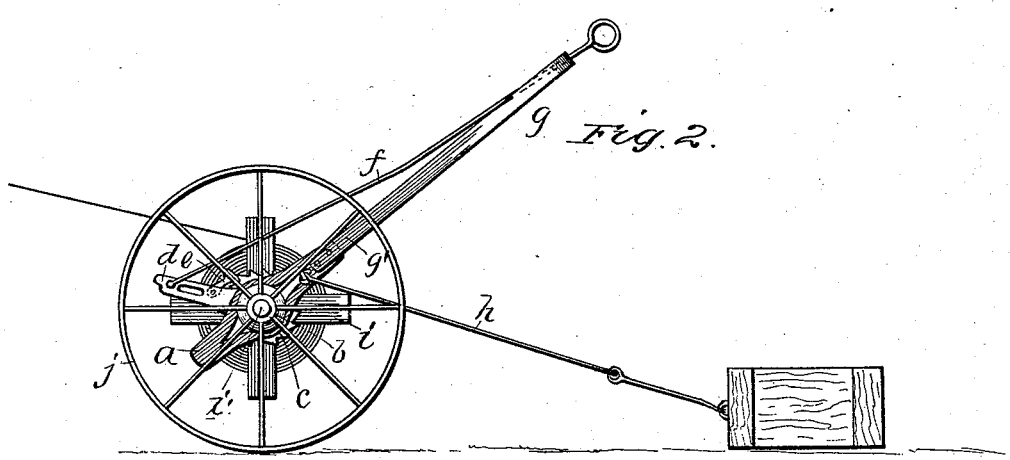
Figure 3:
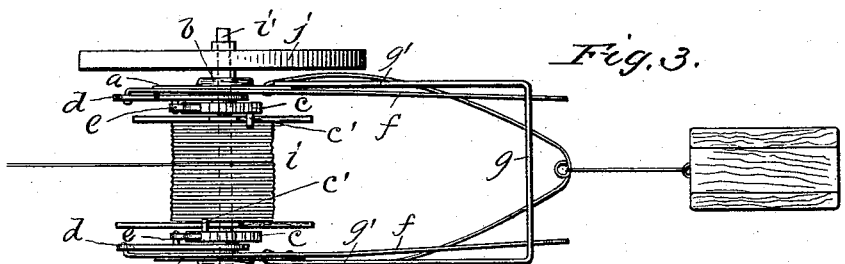

In the drawings, Figure 1 is a perspective view of my machine with the reel detached. Fig. 2 is a side elevation of it mounted on wheels and in position for operation. Fig. 3 is a plan thereof.

In the construction shown, $a\ a$ designate two upwardly and rearwardly inclined side bars which form the lower end of the main frame to which the mechanism is secured. Hollow stud-axles $b\ b$ are journaled in these side bars $a\ a$ about midway their ends and have formed on or secured to their inner ends the ratchet-wheels $c\ c$. Mounted loosely on the stud-axles, between the ratchet-wheels and the side bars $a\ a$, are the forwardly-extending levers or pawl-carrying arms $d\ d$. These levers carry pawls $e\ e$, which are pivoted to their inner sides adjacent the ratchet-wheels $c\ c$ and engage said ratchet-wheels and are kept in contact therewith by the force of gravity, or by a spring, if desired. To the forward ends of the levers $c\ c$ are secured the rearwardly and upwardly extending operating-rods $f\ f$. These rods pass through apertures in the upper cross-bar of a ∩-shaped frame or yoke $g$, whose lower ends $g'\ g'$ are secured to the upper ends of the side bars $a\ a$. Above the cross-bar of the frame $g$ the rods $f\ f$ are formed into hand-holds, which are to be grasped by the operator when reeling wire.

To the outer side of the side bars $a\ a$, near the upper ends thereof, is pivoted a rearwardly-extending bail $h$, to the rear end of which a weight or drag is secured when the machine is in operation, for a purpose hereinafter set forth.

When the machine is in position for operation, an ordinary reel $i$, on which wire is to be wound, is placed between the ratchet-wheels $c\ c$, the shaft $e'$ of said reel extending through the hollow stud-axles $b\ b$. On the outer ends of the shaft $e'$, outside of the side bars $a\ a$, are loosely mounted transporting-wheels $j\ j$.

Formed on or secured to the inner faces of the ratchet-wheels $c\ c$, at a suitable distance from their outer peripheries, are inwardly-projecting pins $c'\ c'$, which engage the arms $i'\ i'$ of the reel and cause it to revolve with the ratchet-wheels $c\ c$.

The operation of my machine in reeling is as follows: A weight is attached to the bail $h$ to act as a drag to give weight to the machine to hold it steady and to cause a tension on the wire to be reeled, one end of the wire being secured to a fence-post or any other stationary object. The other end is secured to the reel. The operating-rods are grasped by means of the hand-holds and moved backward and forward and operate through the levers $d\ d$ and pawls $e\ e$ to revolve the ratchet-wheels $c\ c$. The pins $c'\ c'$ on the ratchet-wheels engage the arms $i'\ i'$ of the reel and cause it to revolve with said ratchet-wheels. If the drag is made light and the tension on the wire is correspondingly small, the rods $f\ f$ may be moved backward and forward alternately and the wire reeled very rapidly; but if the drag is made heavy and the tension on the wire is great the rods $f\ f$ may be moved backward simultaneously and forward alternately in order to have the strain of reeling the wire evenly distributed and to prevent the wire unreeling when the levers $d\ d$ moved forward to continue the operation of reeling.

It is evident that the machine may with equal advantage be employed for unreeling and straining wire in making fences, laying cables, &c., in which case the drag-weight is not employed.

From the foregoing the operation and advantages of my machine will be readily understood, the main advantages over my old machine being that all side draft is avoided and

Having thus fully described my invention, what I claim, and desire to secure by Letters Patent, is—

1. The combination of an axle and transporting-wheels, two independent hollow stud-axles mounted on said axle, one near each wheel, a frame having its forwardly-extending arms secured loosely to the respective stud-axles, a ratchet-wheel secured rigidly on the inner end of each of the stud-axles and carrying means to engage the reel, levers loosely mounted on the stud-axles and carrying pawls engaging the ratchet-wheels, and operating-rods connected to these levers and extending rearwardly, substantially as described.

2. A machine for reeling wire, consisting of a frame, hollow stud-axles loosely mounted in said frame, ratchet-wheels secured to the inner ends of said axles, inwardly-projecting pins on the inner faces of said wheels, levers loosely mounted on the stud-axles between the ratchet-wheels and the side bars of the supporting-frame, pawls carried by said levers and engaging the ratchet-wheels, operating-rods secured to the levers and extending rearwardly, a bail pivoted to the frame, and a weight secured to said bail, in combination with a reel and transporting-wheels, substantially as described.

In testimony whereof I affix my signature in presence of two witnesses.

WILLIAM DULIN.

Witnesses:
H. R. DULIN,
J. F. JACKSON.